(12) United States Patent
In et al.

(10) Patent No.: US 8,923,572 B2
(45) Date of Patent: Dec. 30, 2014

(54) MOBILE TERMINAL AND CONTROL METHOD THEREOF

(75) Inventors: Seunghee In, Seoul (KR); Yunjueng Mhun, Seoul (KR); Sesook Oh, Chungcheongnam-do (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 13/492,739

(22) Filed: Jun. 8, 2012

(65) Prior Publication Data

US 2013/0044921 A1    Feb. 21, 2013

(30) Foreign Application Priority Data

Aug. 18, 2011 (KR) .................. 10-2011-0082452

(51) Int. Cl.
| | | |
|---|---|---|
| *G06K 9/00* | (2006.01) | |
| *G06F 3/048* | (2013.01) | |
| *H04M 1/725* | (2006.01) | |
| *H04M 1/2745* | (2006.01) | |

(52) U.S. Cl.
CPC ...... H04M 1/72583 (2013.01); H04M 1/27455 (2013.01)
USPC ............ 382/115; 382/100; 715/810; 715/823

(58) Field of Classification Search
CPC .............. H04L 1/00; H04M 1/00; G06F 1/00; H04N 1/00
USPC ......... 715/716, 751, 738, 810, 823, 781, 846, 715/760; 382/100, 115
See application file for complete search history.

(56) References Cited

U.S. PATENT DOCUMENTS

| | | | |
|---|---|---|---|
| 7,864,988 B2 * | 1/2011 | Cho et al. ................ | 382/115 |
| 8,392,951 B2 * | 3/2013 | Park et al. ................ | 725/60 |
| 8,405,740 B2 * | 3/2013 | Nichols et al. ............ | 348/231.2 |
| 8,589,069 B1 * | 11/2013 | Lehman .................... | 701/438 |
| 2006/0120568 A1 * | 6/2006 | McConville et al. ...... | 382/115 |
| 2009/0213086 A1 * | 8/2009 | Chae et al. ................ | 345/173 |
| 2010/0162171 A1 | 6/2010 | Felt et al. | |
| 2010/0216441 A1 | 8/2010 | Larsson et al. | |
| 2011/0081948 A1 | 4/2011 | Shirai et al. | |
| 2011/0216087 A1 * | 9/2011 | Gritton et al. ............. | 345/629 |

FOREIGN PATENT DOCUMENTS

| | | |
|---|---|---|
| CN | 101251844 | 8/2008 |
| CN | 101359334 | 2/2009 |
| CN | 101547303 | 9/2009 |
| CN | 102035935 | 4/2011 |
| WO | 2008/067475 | 6/2008 |
| WO | 2009/046574 | 4/2009 |

OTHER PUBLICATIONS

The State Intellectual Property Office of the People's Republic of China Application Serial No. 201210225530.7, Office Action dated Feb. 8, 2014, 9 pages.
European Patent Office Application Serial No. 12170764.0, Search Report dated Jul. 28, 2014, 8 pages.

* cited by examiner

*Primary Examiner* — Sheela Chawan
(74) *Attorney, Agent, or Firm* — Lee, Hong, Degerman, Kang & Waimey

(57) ABSTRACT

In a mobile terminal capable of retrieving data, and a control method thereof, the mobile terminal includes a display unit to display at least one object, and a controller to detect information included in an object selected by a user from the at least one object, retrieve objects each having data corresponding to the detected information, and process the retrieved objects to be associated with the selected object.

25 Claims, 20 Drawing Sheets

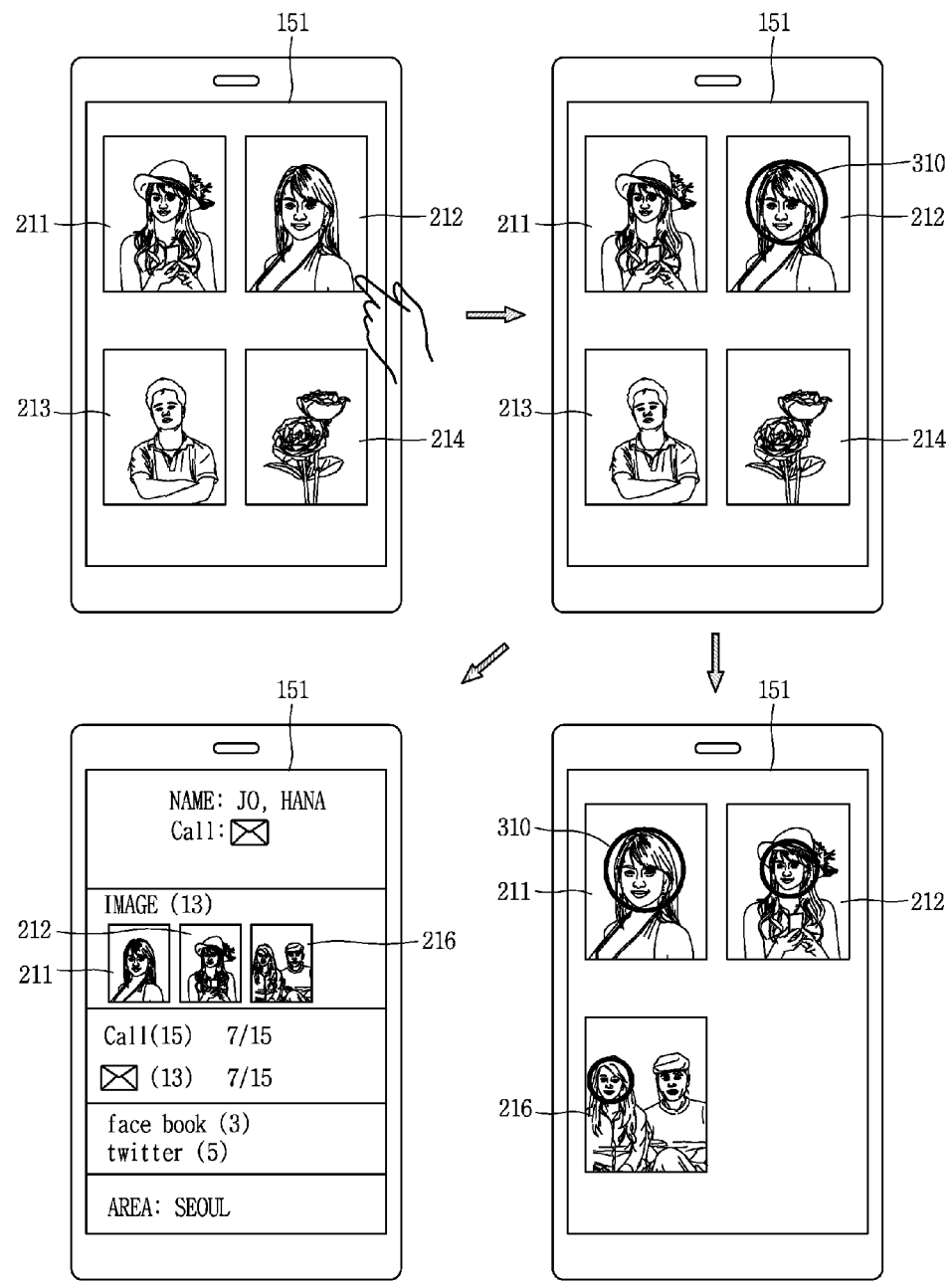

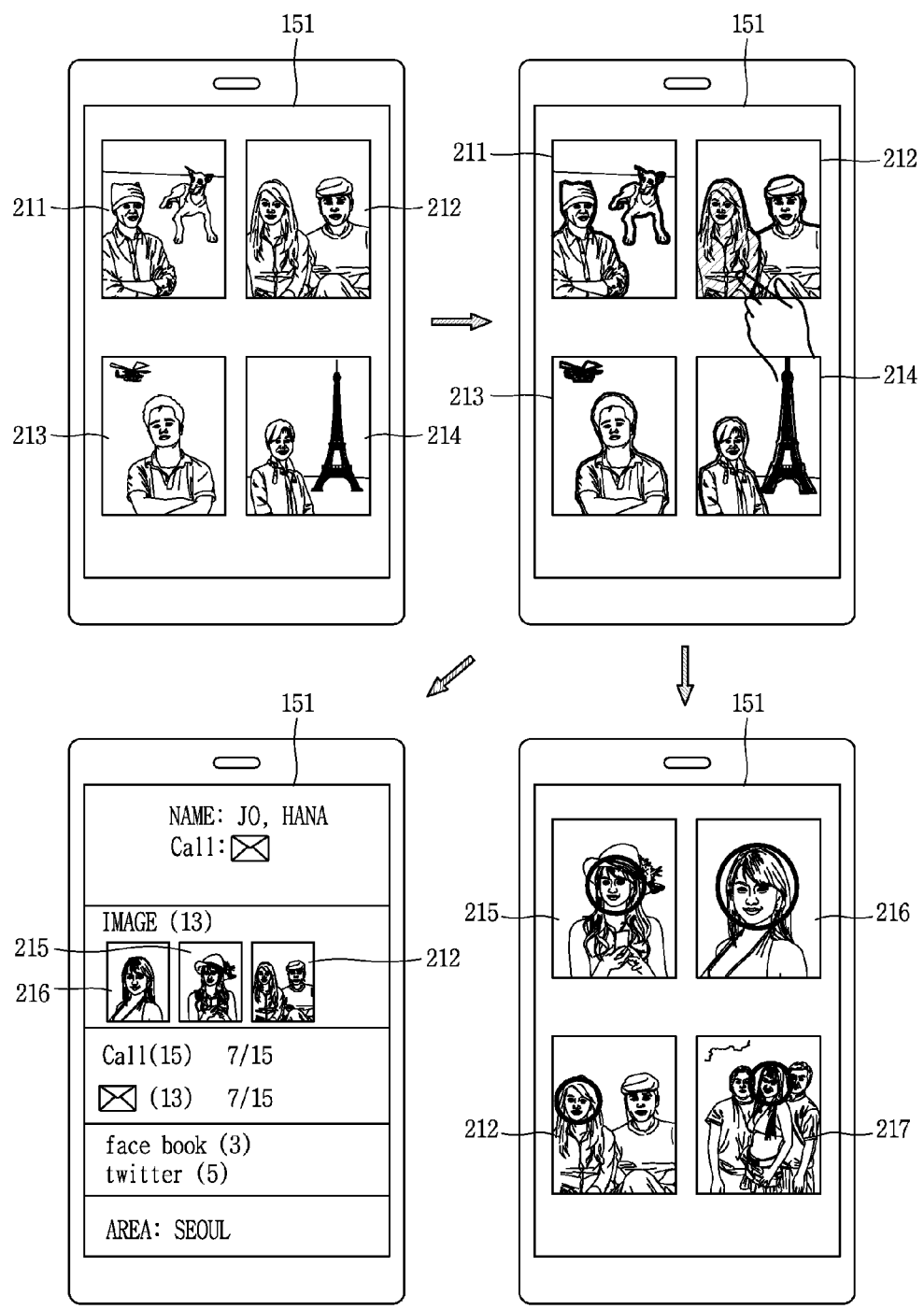

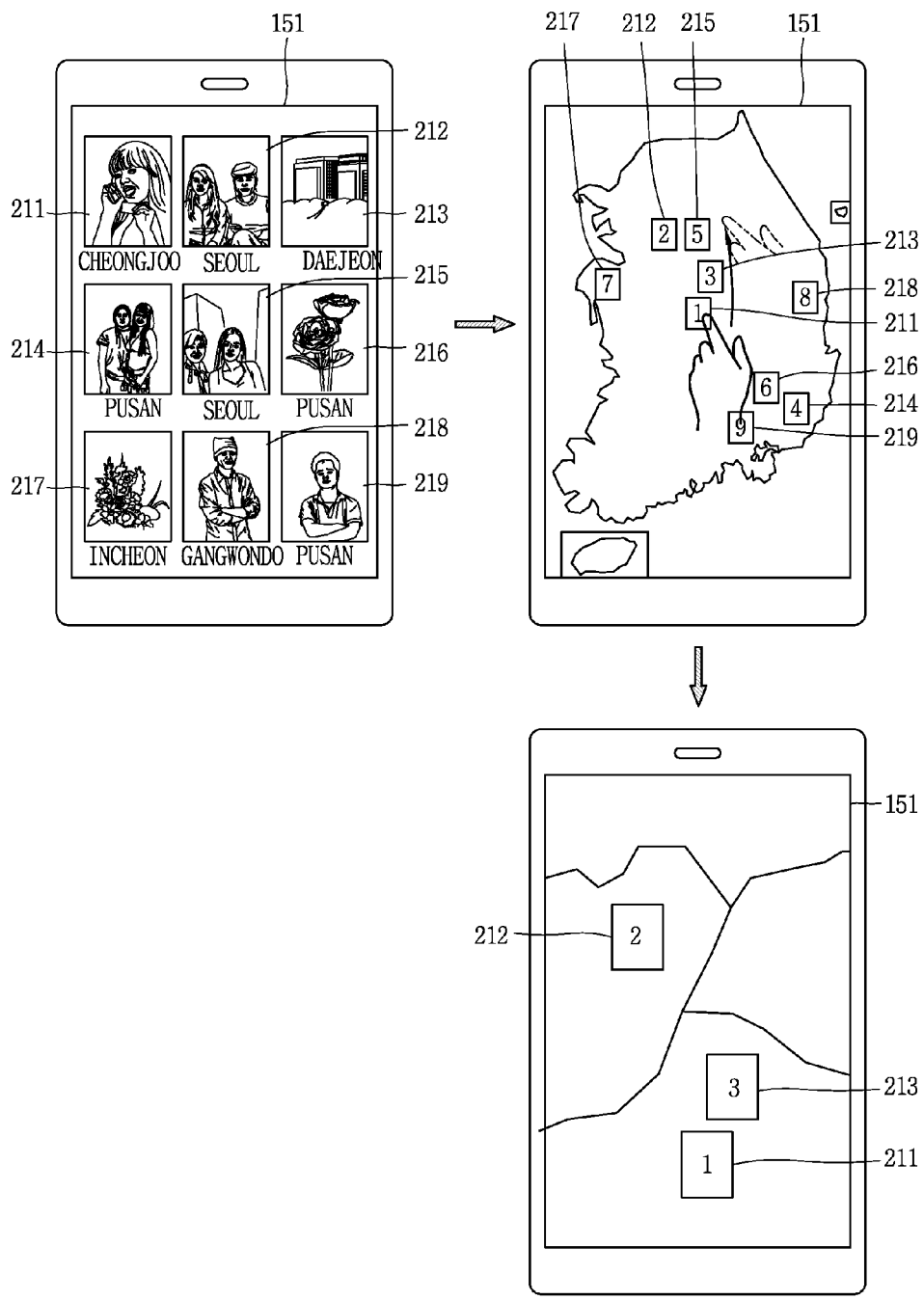

MOBILE TERMINAL AND CONTROL METHOD THEREOF

CROSS-REFERENCE TO RELATED APPLICATION

Pursuant to 35 U.S.C §119(a), this application claims the benefit of earlier filing date and right of priority to Korean Patent Application No. 10-2011-0082452, filed on Aug. 18, 2011, the contents of which are incorporated by reference herein in its entirety.

BACKGROUND OF THE INVENTION

1. Field of the Invention

This specification relates to a mobile terminal (mobile device, portable terminal) allowed for data retrieval (search), and a control method thereof.

2. Background of the Invention

Mobile device (mobile terminal, portable device, portable terminal) can be easily carried and have one or more of functions such as supporting voice and video telephony calls, inputting and/or outputting information, storing data and the like.

As it becomes multifunctional, the mobile terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions.

Furthermore, many efforts are undergoing to support or enhance various functions of such mobile terminals. Such many efforts include not only changes and improvement of structural components implementing a mobile terminal but also software or hardware improvement.

When retrieving information from a memory or a web site using a mobile terminal, it is inconvenient that a correct search word, which can represent a target to be retrieved, should be input.

SUMMARY OF THE INVENTION

Therefore, an aspect of the detailed description is to provide a mobile terminal capable of simply retrieving information associated with a target in which a user is interested, and a control method thereof.

To achieve these and other advantages and in accordance with the purpose of this specification, as embodied and broadly described herein, there is provided a mobile terminal including a display unit to display at least one object, and a controller to detect information included in an object selected by a user from the at least one object, retrieve objects each having data corresponding to the detected information, and process the retrieved objects to be associated with the selected object.

In accordance with the exemplary embodiment, the controller may detect tags included in the selected object.

In accordance with the exemplary embodiment, when a plurality of tags are detected by the controller, the plurality of tags may be displayed on the display unit, and objects corresponding to at least one of the plurality of tags, selected by the user, may be retrieved.

In accordance with the exemplary embodiment, the controller may set a retrieval condition based on a user selection and retrieve objects corresponding to the set retrieval condition.

In accordance with the exemplary embodiment, the object displayed on the display unit may be an image, and the information may be information related to a person or thing included in an image selected by the user.

In accordance with the exemplary embodiment, the controller may recognize the person or thing from the image using a recognition algorithm.

In accordance with the exemplary embodiment, when the recognized person or thing is in plurality, at least one of the plurality of persons or things may be selected by the user.

In accordance with the exemplary embodiment, the plurality of persons or things may be displayed in a highlighting manner.

In accordance with the exemplary embodiment, a retrieval range for retrieving objects corresponding to the detected information may be set by the user.

In accordance with the exemplary embodiment, the controller may display retrieval ranges in which objects corresponding to the detected information are retrievable, and set at least one of the displayed retrieval ranges, selected by the user, as a retrieval range.

In accordance with the exemplary embodiment, the controller may set a retrieval range based on a touch point detected on the display unit after selection of the object.

In accordance with the exemplary embodiment, the retrieval range may be an area surrounded by dragging detected on the display unit.

In accordance with the exemplary embodiment, the controller may display the retrieved objects on the display unit together with the selected object.

In accordance with the exemplary embodiment, the retrieved objects may be in plurality, and the retrieved objects may be displayed to have different distances from the selected object according to priorities.

In accordance with the exemplary embodiment, the retrieved objects may be displayed adjacent to the selected object in sequence of higher priorities of the retrieved objects.

In accordance with the exemplary embodiment, the selected object may be displayed on a position fixed by the user, and the retrieved objects may be aligned based on the position of the selected object displayed.

In accordance with the exemplary embodiment, when the position of the selected object changes, the controller may realign the retrieved objects based on the change and display the same on the display unit.

In accordance with the exemplary embodiment, the controller may align the retrieved objects based on at least one of date, person, tag and attribute information, and the retrieved objects may be displayed on the display unit in a consecutive manner with the information included in the selected object.

In accordance with another exemplary embodiment, there is provided a mobile terminal including a display unit to display at least one object, and a controller to detect information included in a first object selected by a user from the at least one object, and display a second object having data corresponding to the detected information on the display unit to be adjacent to the first object.

In accordance with the another exemplary embodiment, the first and second objects may include position information, respectively, and a map may be displayed on the display unit. Here, the first and second objects may be located on the map based on the position information.

In accordance with the another exemplary embodiment, the controller may display the adjacently displayed second object in a highlighting manner, and function menus associated with the second object may be output.

To achieve these and other advantages and in accordance with the purpose of this specification, as embodied and broadly described herein, there is provided a control method for a mobile terminal including a display unit to display at least one object, the method including detecting information included in an object selected by a user from the at least one object, and retrieving objects having data corresponding to the detected information, and processing the retrieved objects to be associated with the selected object.

In accordance with the exemplary embodiment, the retrieved objects may be displayed on the display unit together with the selected object.

In accordance with the exemplary embodiment, when the object is selected by the user, the selected object is displayed in a highlighting manner.

In accordance with the exemplary embodiment, the display unit may display at least one retrieval range, in which objects corresponding to the selected object are retrievable.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5A to 5D are overviews showing a method for setting information used for search (retrieval) in the mobile terminal;

FIGS. 7A to 7F are overviews showing a method for displaying retrieval results in the mobile terminal.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described in this specification may include cellular phones, smart phones, laptop computers, digital broadcasting terminals, personal digital assistants (PDAs), portable multimedia players (PMPs), navigators, and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
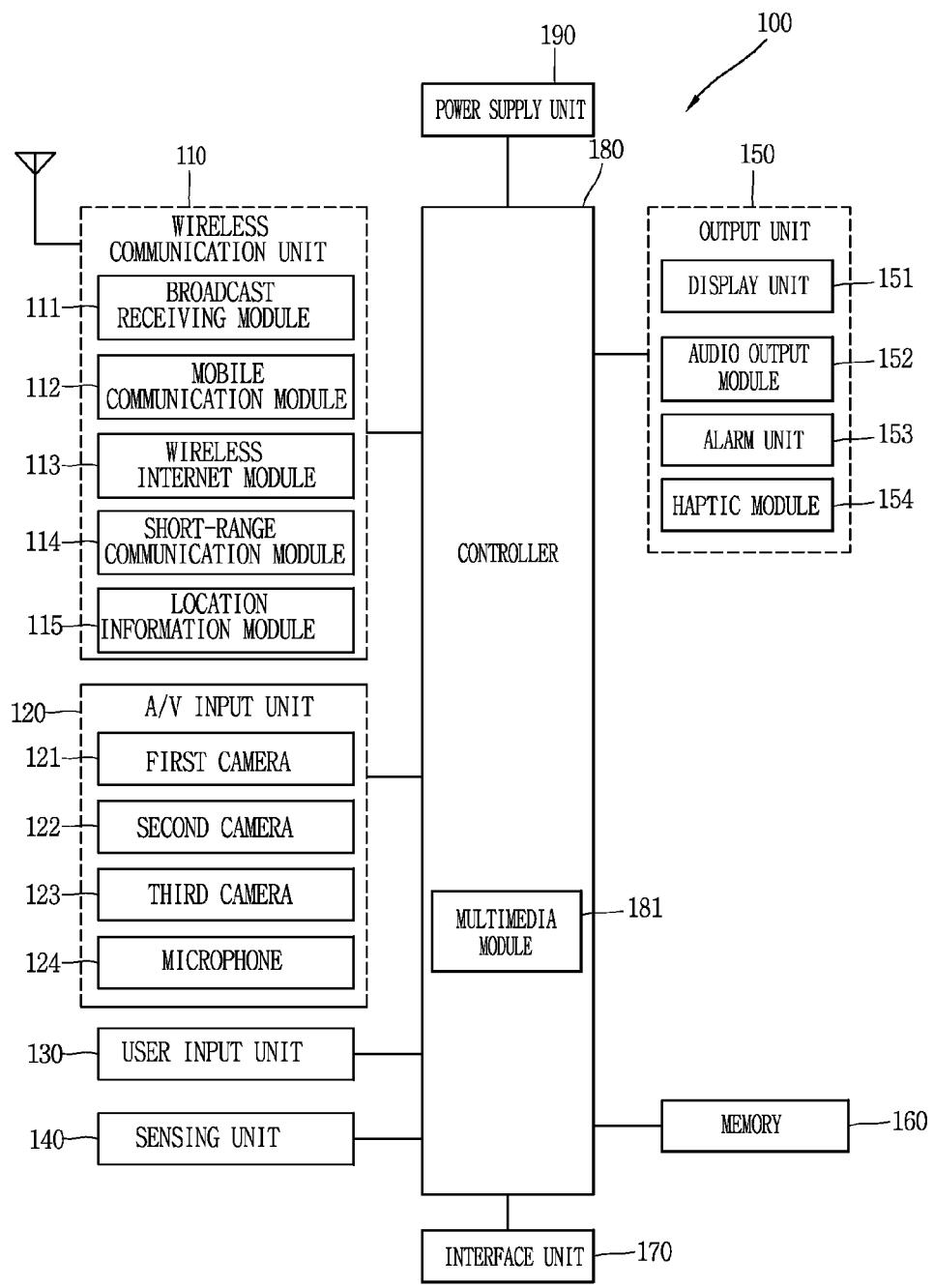
FIG. 1 is a block diagram of a mobile terminal in accordance with one exemplary embodiment.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a caller's image. The voice call mode indicates a state of calling without watching the caller's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

Also, the controller 180 may execute a lock state, in which a user is restricted from inputting a control command for applications, when a state of the mobile terminal satisfies a preset condition. The controller 180 may control a lock screen, which is displayed in the lock state, based upon a touch input detected on the display unit 151 (hereinafter, referred to 'touch screen') in the lock state.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Also, the controller 180 may detect information included in an object selected by a user from at least one object displayed on the display unit 151.

The controller 180 may retrieve other objects each having data corresponding to the detected information, and process the retrieved objects to be associated with the user-selected object.

Here, an object indicates a target which is affected by a user's intension or behavior, for example may be image, video, icon, sound, email, SNS posting, memo, sent or received contents of call or instant message and the like. In addition to those examples, various types of objects may exist.

Hereinafter, description will be given of a method for processing other objects in connection with an object selected by a user to be associated with the selected object in a mobile terminal according to the present disclosure, with reference to FIGS. 2 and 3.

Figure 2:
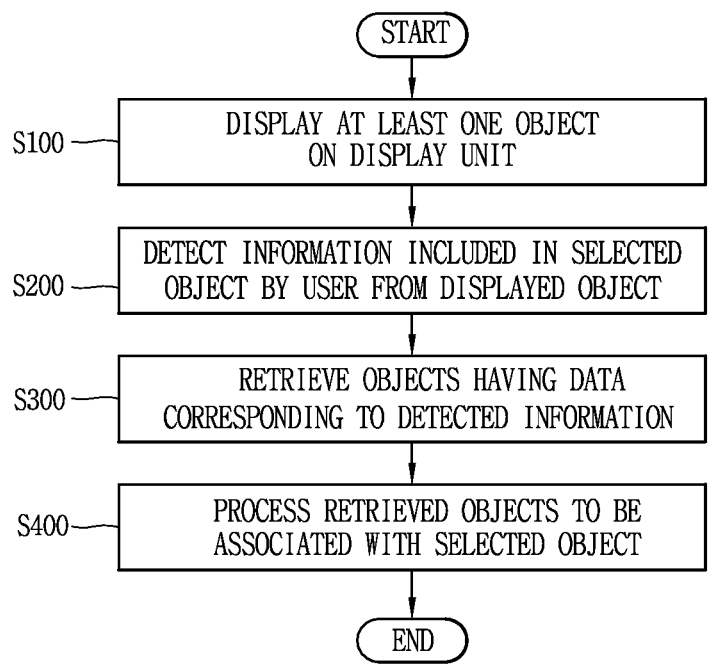
FIG. 2 is a flowchart showing a control method for a mobile terminal in accordance with one exemplary embodiment.
Figure 3:
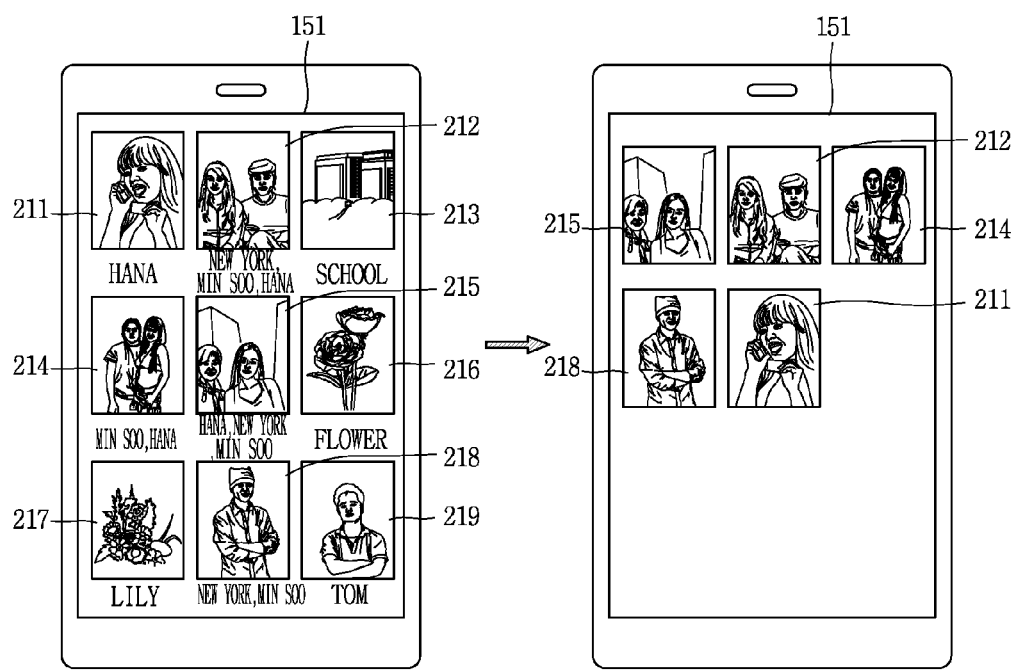
FIG. 3 is an overview showing the control method for the mobile terminal.

FIG. 2 is a flowchart showing a control method for a mobile terminal in accordance with one exemplary embodiment, and FIG. 3 is an overview showing the control method for the mobile terminal.

A mobile terminal in accordance with one exemplary embodiment may include a display unit 151 (see FIG. 3) disposed on one surface, for example, a front surface. The display unit 151 may be configured to be sensitive to touch.

According to the control method, first at least one object may be displayed on the display unit 151 (S100).

For example, as shown in FIG. 3, the display unit 151 may display 1st to 9th image objects 211 to 219.

A type of object displayed on the display unit 151 may be based on a user selection. When the user selects a gallery menu, image objects shown in FIG. 3 may be displayed.

The number of objects displayed on the display unit 151 may depend on the setting by the user or the controller 180.

Next, when the user selects at least one of the 1st to 9th objects 211 to 219 displayed on the display unit 151, the controller 180 may detect information included in the selected object (S200, see FIG. 2).

Here, the operation that the user 'selects' at least one of the objects may indicate that an object is 'selected' in response to a preset type of touch input detected on the touch-sensitive display unit 151.

It may also be possible to set an object to be selected using a separately displayed functional key. The preset type of touch input may indicate touch inputs, such as 'double touch, single touch, long touch, drag touch, flicking touch and the like' or a combination thereof.

For example, when 'long touch (long press)' is input on an object, the controller 180 may recognize it as the object being selected, and the touching manner may be set by a user or the controller 180 in various ways.

The controller 180 may recognize an object as being selected in response to a preset touch input. Hence, a touch input to generate another control command may be distinguishable from a touch input to select an object.

Here, the information included in the object may be information input by the user or the controller 180. Examples of such information included in the object may be various object-related matters, such as an attribute of the object, a generated date of the object, a size of the object (file size), a type of the object, an area where the object is generated, a tag included in the object, recognition information relating to a figure (person) or thing included in the object, and the like.

Meanwhile, the tag is a type of keyword set consisting of words indicating characteristic, type, meaning, title, date, related contents and the like, all in connection with an object. The tag may be input by the user or automatically included by the controller 180.

Also, tag information or keyword may be represented in form of metadata, which is, for example, data to explain an object. The metadata is used for the tag or keyword information to be efficiently retrieved.

When the user selects an object, the controller 180 may detect the aforementioned information included in the object. For example, the controller 180, as shown in FIG. 3, may detect various information associated with a 5th image object 215 selected by the user.

The controller 180 may retrieve objects each having data corresponding to the detected information in relation to the 5th image object 215 (S300).

Here, 'data corresponding to the detected information' may have association more than a reference set by the user or controller 180, such as being equal or similar to at least one of the detected information.

Also, the degree or level of the equality or similarity between the information included in the user-selected object and the object retrieved by the controller 180 may be variously set by the user or controller 180.

For example, upon retrieving objects, which have data corresponding to tag information included in the user-selected object, if two tags are included in the selected object, the controller 180 may retrieve objects corresponding to both the two tags or objects corresponding to one of the two tags.

For example, referring to FIG. 3, the 5th image object 215 as the user-selected object includes three tags of 'Hana,' 'New York,' and 'Minsoo.' If the controller 180 detects tag information included in the image object and retrieves objects including corresponding tags, the controller 180 may detect the tags 'Hana,' 'New York,' and 'Minsoo' included in the 5th image object 215, and retrieve other objects each having data corresponding to the tags.

When it is set in the controller 180 to retrieve objects including a tag, which corresponds to even any one of the tags included in the 5th image object 215, the controller 180 may retrieve objects, which corresponds to even at least one of 'Hana,' 'New York,' and 'Minsoo.'

Hence, the controller 180 may retrieve a 1st image object 211 including the tag 'Hana', a 2nd image object 212 including all of the tags 'Hana,' 'New York,' and 'Minsoo,' a 4th image object 214 including the tags 'Hana' and 'Minsoo,' and an 8th image object 218 including the tag 'New York.'

Meanwhile, the exemplary embodiment has illustrated that a tag included in an image object is detected and image objects including a tag corresponding to the detected tag are retrieved. However, the present disclosure may not be limited to the exemplary embodiment, but be applicable to another object which has a type and a manner of including corresponding data different from a selected object.

For example, when a selected image is an image object, retrieved objects may be text objects other than such image objects. Also, when the controller 180 detects tag information included in an image object, data included in retrieved objects may not always be included in form of the tag information.

As mentioned above, once retrieving the objects having data corresponding to the detected information (S300, see FIG. 2), the controller 180 may process the retrieved objects to be associated with the selected object (S400, see FIG. 2).

Here, 'processing to be associated' indicates that the retrieved objects are processed to have an association with the selected object. For example, only the retrieved objects may be separately sorted from many objects, and displayed together with the selected object on the display unit 151.

Also, a function window may be output to provide functions, which are related to the selected object and the retrieved objects, for example, sending and compressing objects, deleting objects, displaying area information on objects and the like.

For example, referring to FIG. 3, the controller 180 may display 1st, 2nd, 4th and 8th image objects 211, 212, 214 and 218, which have data corresponding to the information included in the 5th image object 215 selected by the user from the 1st to 9th image objects 211 to 219 displayed on the display unit 151, on the display unit 151 together with the 5th image object 215.

As such, the controller 180 may display other objects, which have the association with the user-selected object, together with the selected object, thereby allowing a user to recognize the associated objects at a glance.

That is, in accordance with the mobile terminal and the control method thereof according to the exemplary embodiment, when a user selects an object, information included in the selected object is detected, objects corresponding to the detected information are retrieved, and those objects are processed to be associated with each other, thereby providing intuitive information related to the mutually associated objects immediately to the user.

Hereinafter, description will be given of a method for detecting information related to other objects, in addition to the method for detecting the information related to the image object as described above, with reference to FIGS. 4A to 4D.

FIGS. 4A to 4D are overviews showing a method for detecting information included in objects in the mobile terminal.

As aforementioned, the object is a target affected by a user's intension or behavior, various types of objects in addition to the above-mentioned objects may exist.

Hereinafter, description will be given of a method for retrieving objects having data associated with a selected object, giving several examples of various types of objects.

Figure 4A:
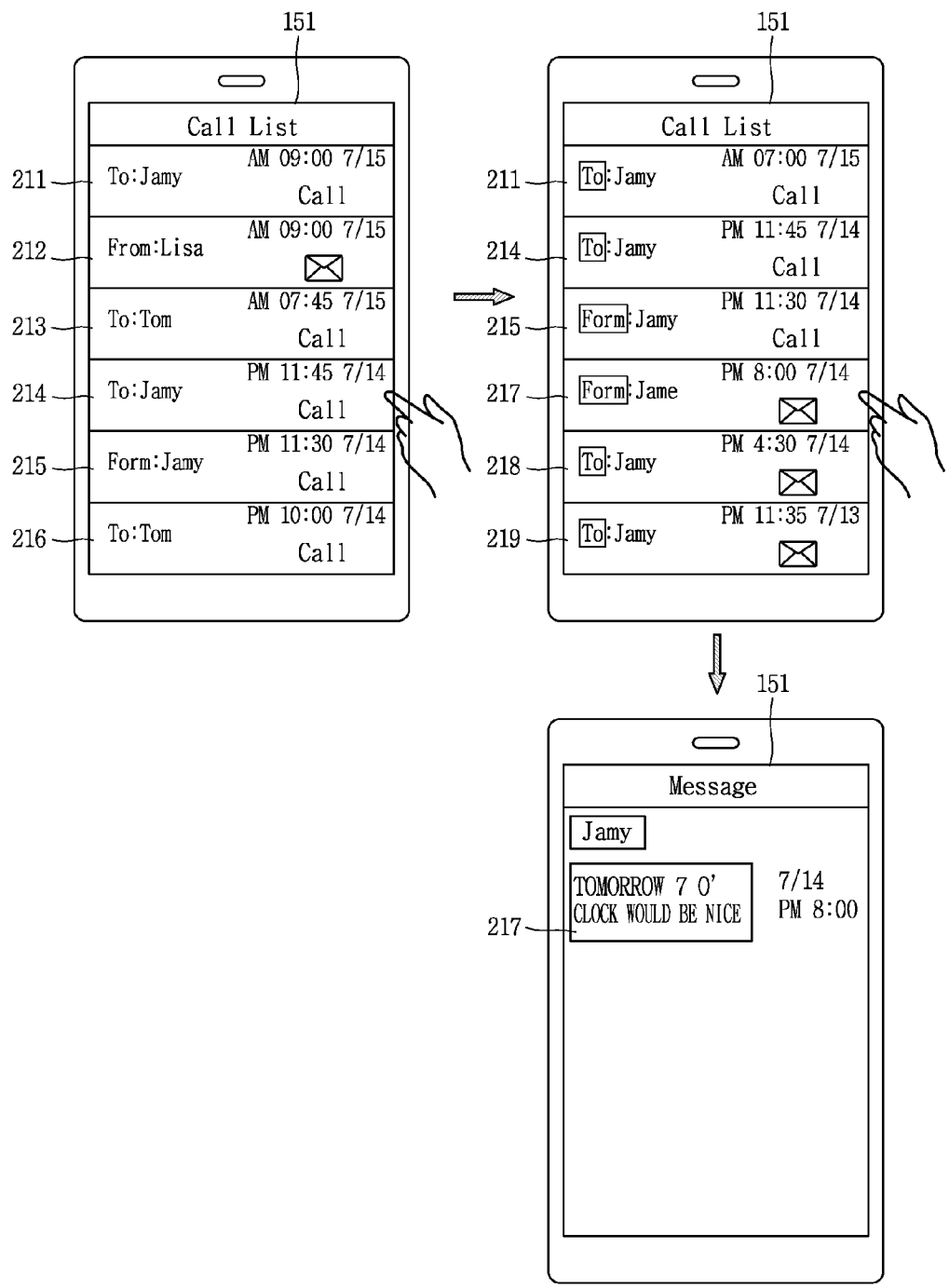
FIGS. 4A to 4C are overviews showing a method for detecting information included in an object in the mobile terminal.

First, FIG. 4A shows objects including lists of calls and instant messages originated and terminated.

As shown in FIG. 4A, the display unit 151 may display 1st to 6th list objects 211 to 216, which are originating and terminating call and instant message lists.

The list objects displayed on the display unit 151 may be displayed according to a lapse of time, or based on various references.

When a user selects one list object from the 1st to 6th list objects 211 to 216 shown in FIG. 4A, the controller 160 may detect information included in the selected list object.

For example, when the user selects the 4th list object 214, the controller 180 may detect information included in the 4th list object 214.

Here, the information included in the 4th list object 214 may be various types of information related to calls or messages, for example, an originated or terminated state, originator or terminator related information, time information, area information, information on contents of a message and the like.

In the meantime, specific information, for example, the originator or terminator related information, of those information included in the list objects may be detected on the preferential basis by the setting of the user or the controller 180, and objects having data corresponding to the preferentially detected information may be retrieved.

For example, as shown in FIG. 4A, the controller 180 may retrieves other list objects having data corresponding to 'Jamy', which is terminator information of the 4th list object 214 selected by the user.

Accordingly, the controller 180 may retrieve the 1st, 4th, 5th, 7th, 8th and 9th list objects 211, 214, 215, 217, 218 and 219 each having the data, which includes 'Jamy' as the originator or terminator, and display those retrieved objects on the display unit 151.

Also, the controller 180 may display the objects on different areas of the display unit 151 by sorting them according to the origination and the termination such that the originating or terminating history can be identified.

Here, FIG. 4A has shown the retrieval of all the objects including 'Jamy' as the originator or terminator. Alternatively, objects which have data including 'Jamy' only as the terminator may be retrieved. Such condition may change by the setting of the user or the controller 180.

When one, for example, the 7th list object 217 is selected from the retrieved list objects, the controller 180 may separately display the related detailed information on the display unit 151, so as to provide the user with the detailed information related to the detected object 217.

Hereinafter, objects consisting of postings posted by many users on an SNS site will be described with reference to FIG. 4B.

Figure 4B:
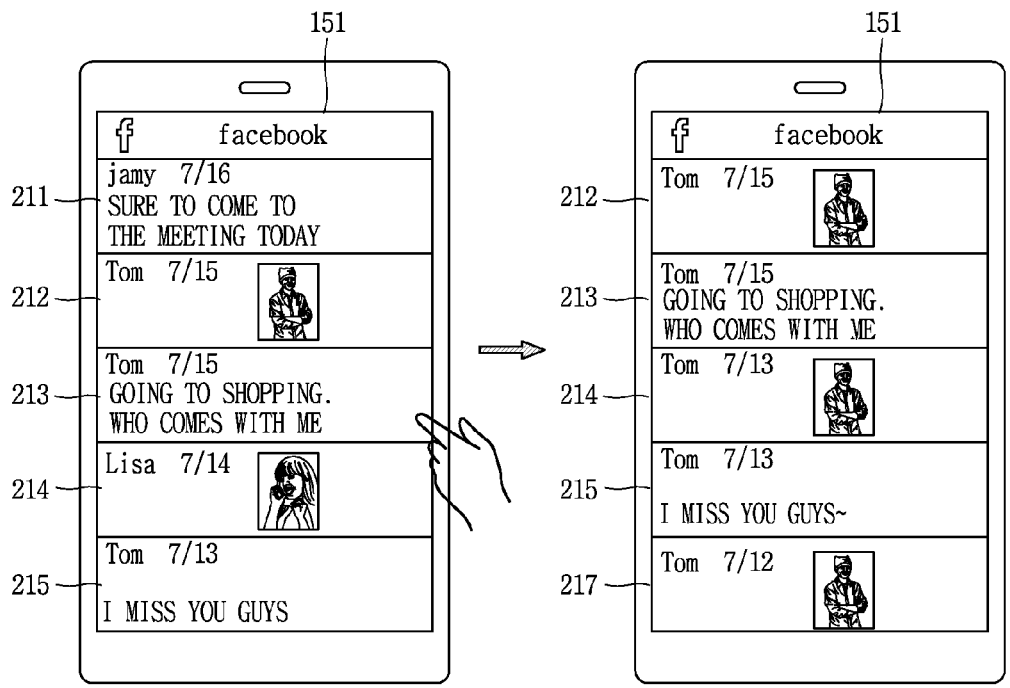

As shown in FIG. 4B, the display unit 151 may display 1st to 5th posting objects 211 to 215 posted on an SNS site, for example, 'Facebook.'

The posting objects displayed on the display unit 151 may be displayed according to a lapse of time (time sequence), by being sorted according to types of contents included in each posting according to a person who posts, and the like.

FIG. 4B shows postings posted according to a lapse of time of those methods.

When a user selects one posting object from the 1st to 5th posting objects 211 to 215, the controller 180 may detect information included in the selected posting object.

For example, when the user selects the 3rd posting object 213, the controller 180 may detect information included in the 3rd posting object 213.

Here, the information included in the 3rd posting object 213 may be various information related to the posting, for example, information on a person who posts the posting, information on the posting, area information, information on comment, and the like.

In the meantime, specific information, for example, the information on the person who posts the posting, of those information included in the list objects may be detected on the preferential basis by the setting of the user or the controller 180, and objects having data corresponding to the preferentially detected information may be retrieved.

For example, as shown in FIG. 4B, the controller 180 may retrieve other objects having data corresponding to 'Tom' which is information on the person who posts the 3rd posting object 213 selected by the user.

Accordingly, the controller 180 may retrieve 2nd, 5th, 6th and 7th posting objects 212, 215, 216 and 217 each having data including 'Tom' as the information on the person who posts the posting, and display those objects on the display unit 151.

Hereinafter, objects associated with a specific date will be described with reference to FIG. 4C.

Figure 4C:
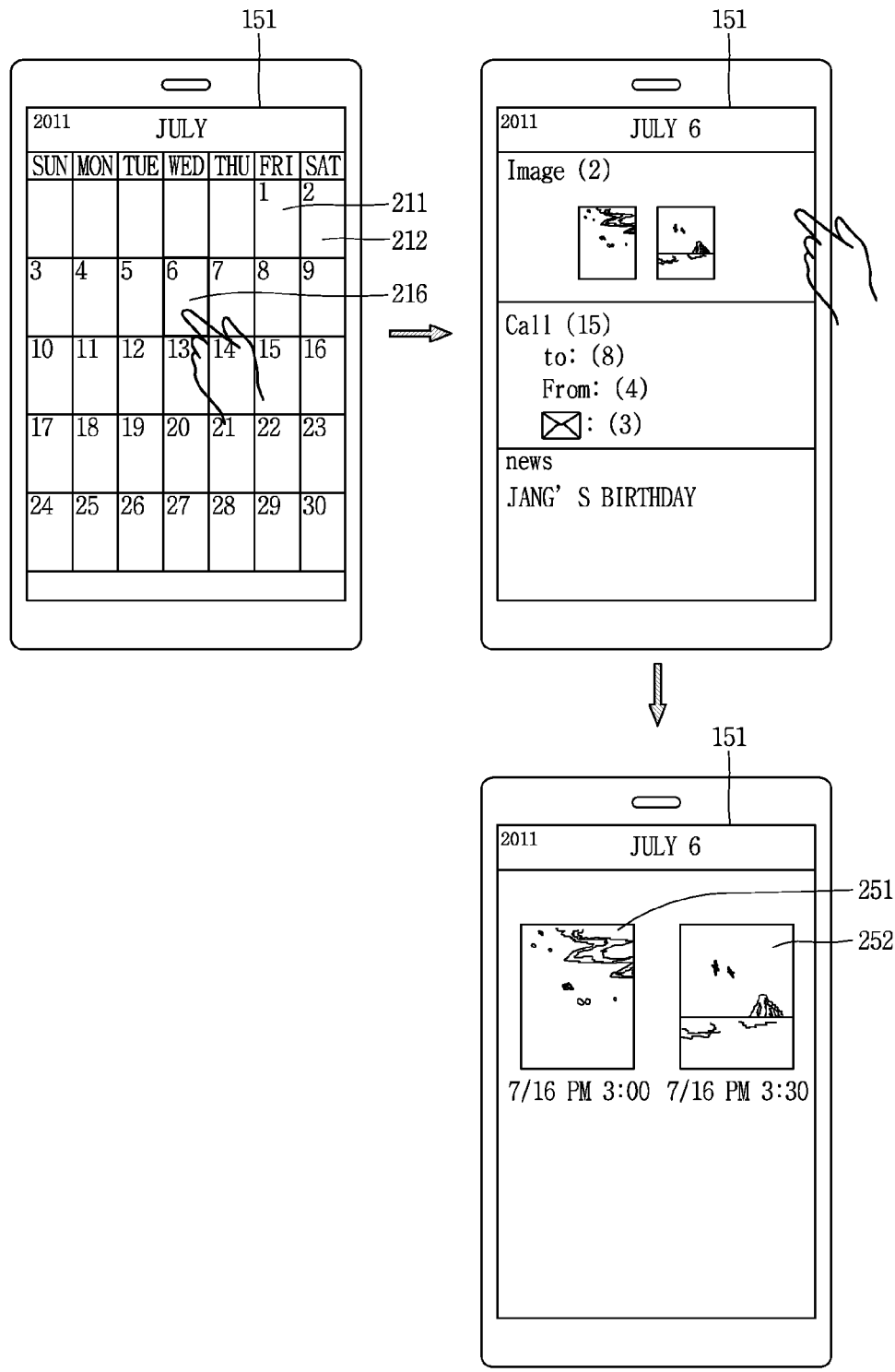

As shown in FIG. 4C, a calendar may be displayed on the display unit 151, and each date from 1st day to 30th day displayed on the calendar may be an independent object.

When one of the date objects displayed on the calendar is selected, the controller 180 may retrieve all the objects which have been generated or stored on a day corresponding to the selected date object.

For example, when the user selects one of the 1st to 30th date objects 211 to 230 shown in FIG. 4C, the controller 180 may detect date information included in the selected date object.

For example, when the user selects the 6th date object 216, the controller 180 may detect date information included in the 6th date object 216.

Here, the date information relating to the 6th date object 216 indicates month, day and year corresponding to the 6th date object 216. For example, 'Jul. 6, 2011' may be the date information.

Meanwhile, an object corresponding to specific information, for example, 'schedule information', of the information included in the date objects may be retrieved by the setting of the user or the controller 180.

Still referring to FIG. 4C, the controller 180 may retrieve all the objects, each of which has data corresponding to the date information of the 6th date object 216 selected by the user.

For example, as shown in FIG. 4C, the controller 180 may retrieve all of various objects, such as image objects, call or message associated objects, event objects, memo objects and the like, each having data corresponding to 'Jul. 6, 2011' as the date information of the 6th date object 216.

Consequently, after those objects associated with image, call, message and event having the date information data are retrieved, when one of the objects is selected, the controller 180 may display detailed information related to the selected object.

In addition to the exemplary embodiment shown in the drawing, when a preset button, for example, 'BACK button' is clicked on a web browser for displaying a website, several websites, which includes 'matters (information) displayed on the corresponding web browser' as common information, may all be displayed on the display unit 151, or website lists may be displayed on the display unit 151.

Meanwhile, according to the mobile terminal and the control method thereof according to the present disclosure, in addition to the aforementioned objects, other objects associated with information included in various objects selected by the user may be retrieved, and processed to be associated with the selected object.

Hereinafter, description will be given of a method for setting information used for object retrieval, of those information included in a selected object.

FIGS. 5A to 5D are overviews showing a method for setting information used for retrieval in the mobile terminal.

In accordance with the mobile terminal and the control method according to the present disclosure, as aforementioned, it is possible to retrieve other objects having data corresponding to at least one of several information included in an object selected by a user.

Also, the user or the controller 180 may set only specific information of the several information to be used for retrieval of other objects. For example, only date information, tag information or figure (person) information may be set to be used for retrieval of other objects.

Figure 5A:
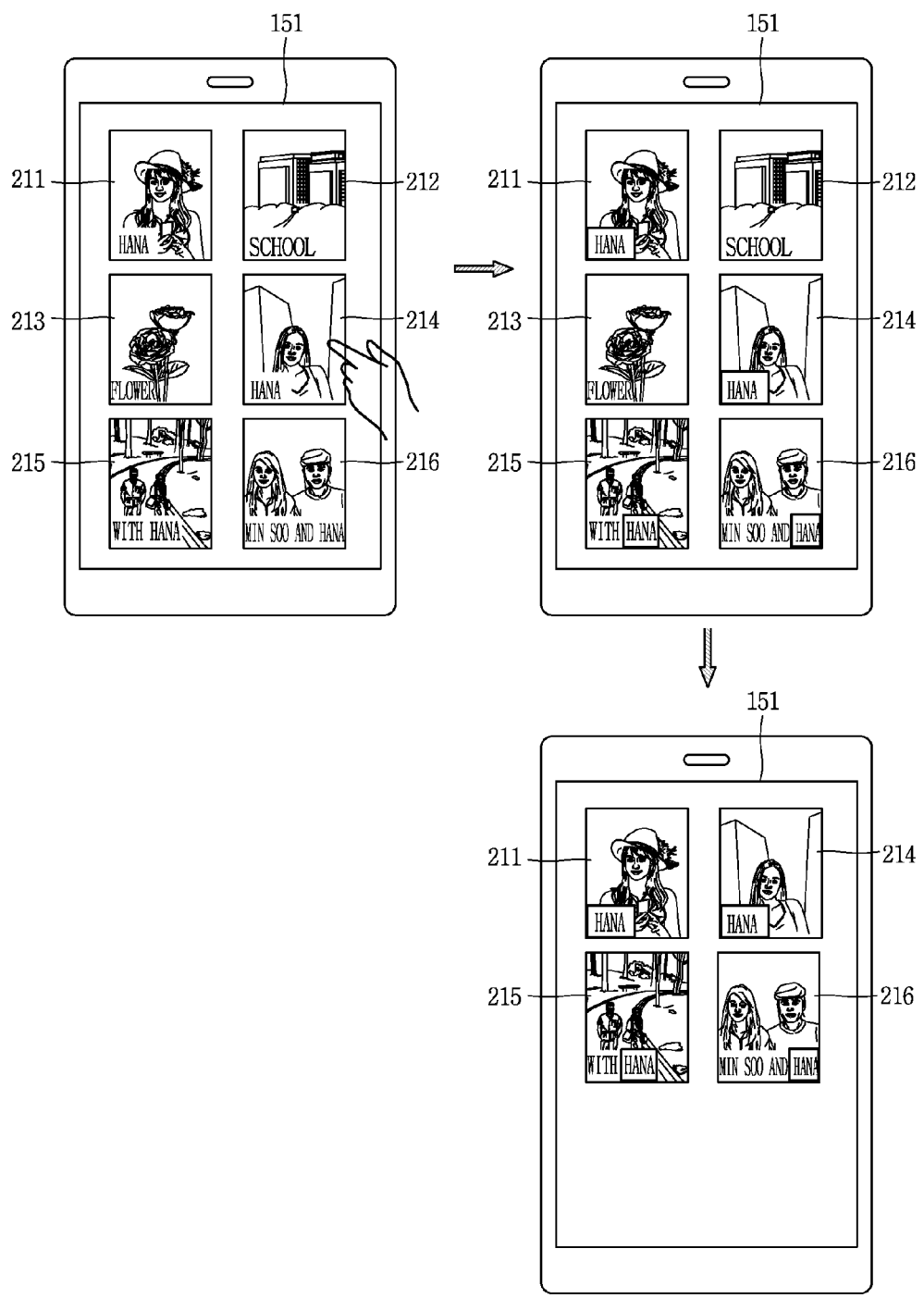
Figure 5B:
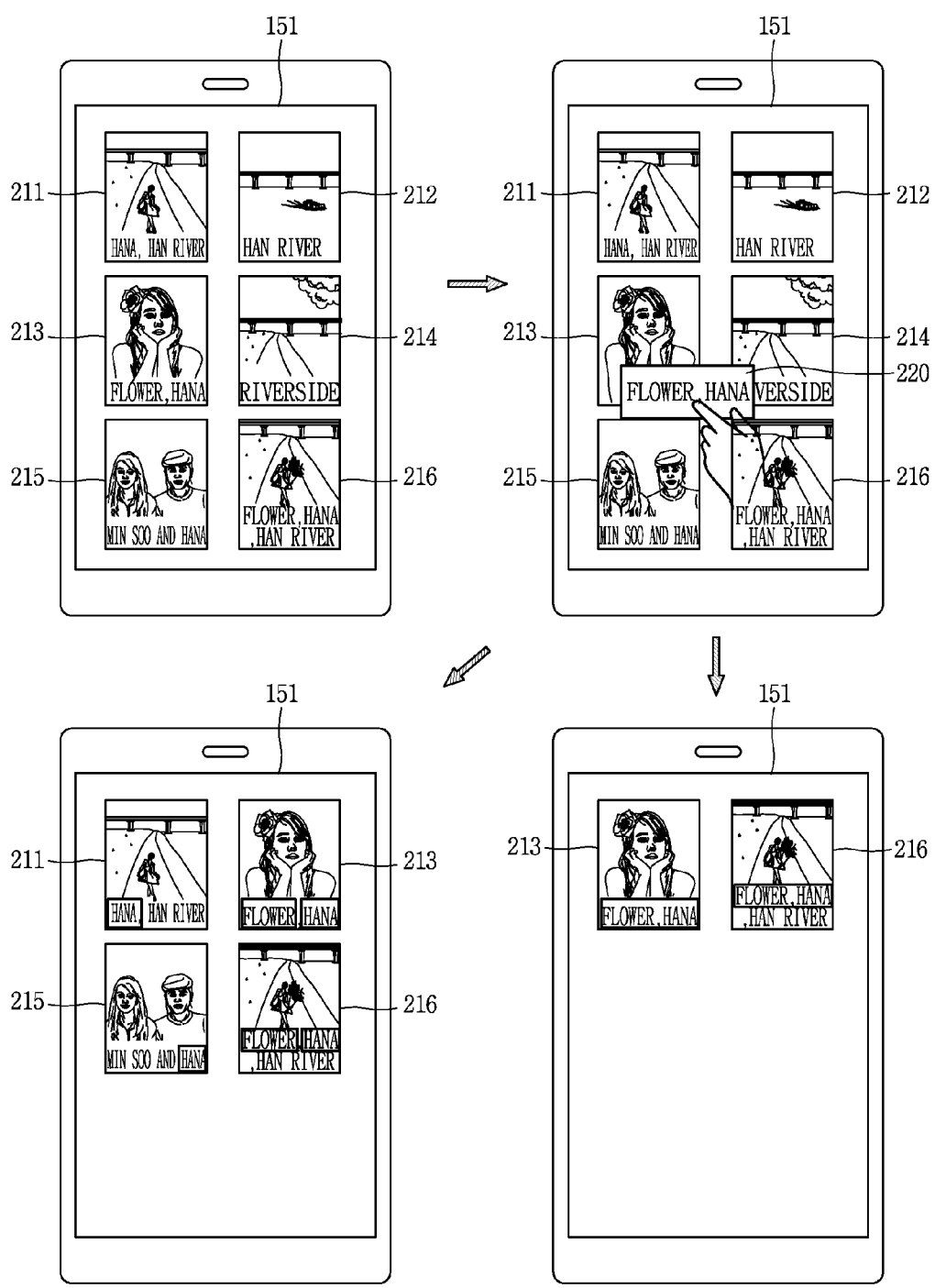

As one example, FIGS. 5A and 5B show a method for retrieving objects using tag information of various types of information included in an image object.

Tag information included in 1st to 6th image objects 211 to 216 shown in FIG. 5A are input by the user or the controller 180. The controller 180 may detect 'Hana,' tag information included in the 4th image object 214 selected by the user.

The controller 180 may retrieve objects each having data corresponding to the tag information 'Hana.'

Also, the controller 180 may display the 1st, 5th and 6th image objects 211, 215 and 216 each having data corresponding to the tag information 'Hana' to be distinguishable from other objects.

The controller 180 may process the retrieved 1st, 5th and 6th image objects 211, 215 and 216 and the selected 4th image object 214 to be associated all together, and separately display the retrieved objects and the selected object on the display unit 151 to be distinguishable from other objects.

As shown in FIG. 5B, when a plurality of tag information are included in the 3rd image object 213 selected by the user, the controller 180 may retrieve objects, which include at least one or all of the plurality of tag information, according to the setting of the user or the controller 180.

Also, the controller 180 may display a select window 220 so as for the user to select at least one of the plurality of tags. The controller 180 may then retrieve objects based on the tag selected by the user on the select window 220.

For example, when only the tag 'Hana' of the two tags 'Flower' and 'Hana' included in the 3rd image object 213 is selected, then the controller 180 may retrieve the 1st, 5th and 6th image objects 211, 215 and 216 including the tag 'Hana' and display the retrieved objects on the display unit 151 together with the selected 3rd image object 213.

When both the two tags 'Flower' and 'Hana' included in the 3rd image object 213 are selected, then the controller 180 may retrieve the 6th image object 216 including both 'Flower' and 'Hana' and display the retrieved 6th image object 216 on the display unit 151 together with the 3rd image object 213.

As described above, according to the mobile terminal and the control method thereof of the present disclosure, it may be possible to retrieve objects, which have data corresponding to information selected by a user from a plurality of information included in an object.

Also, the mobile terminal and the control method according to the present disclosure may allow for retrieval of information included in objects using a figure or thing recognition. For example, a face recognition algorithm may be used to recognize a figure (person) included in an image object and information associated with the recognized person may be detected.

First, referring to FIG. 5C, the controller 180 may detect an area corresponding to a person's 'face' using the face recognition algorithm from the 2nd image object 212, which is selected by the user from the 1st to 4th image objects 211 to 214.

Meanwhile, the controller 180 may provide the user with information related to the recognized 'face' area 310 in a highlighting manner.

The controller 180 may then retrieve objects having data corresponding to the recognized 'face' area 310.

Many methods may be used to retrieve the objects having the data corresponding to the recognized 'face' area 310. As one example, description will be given of a case where information related to the recognized 'face area 310 is previously stored in the memory 160 (see FIG. 1).

For example, when recognition information related to the recognized 'face' area 310 is previously stored in the memory 160, various objects having data associated with the person corresponding to the 'face' area 310 may be retrieved.

The memory 160 may already store the person related information matching with the 'face' area 310. The controller 180 may compare the recognized 'face' area 310 with the person information stored in the memory 160. When being equal to each other, objects having data related to the figure (person) may be retrieved.

For example, as shown in FIG. 5C, when the name of person corresponding to the recognized 'face' area 310 is 'KIM, JUNG SOO,' the controller 180 may retrieve objects associated with the person named 'KIM, JUNG SOO.'

As the result of the retrieval, objects associated with various data related to the person, such as image, message, call information, SNS site information, posting information, area information, phone number information and the like, may all be retrieved, and displayed on the display unit 151.

Also, even if the person information matching with the 'face' area 310 has not been stored in the memory 160, the controller 180 may recognize the person or thing from other image objects using the face or thing recognition algorithm, and retrieve other image objects including the person corresponding to the 'face' area.

Accordingly, as shown in FIG. 5C, the image objects 213 and 216 including the person corresponding to the 'face' area may be retrieved and the retrieved image objects 213 and 216 may be displayed on the display unit 151.

As shown in FIG. 5D, the controller 180 may provide the user with information related to a face or thing recognizable area in a highlighting or underlining manner. Also, the controller 180 may retrieve objects having data corresponding to at least one person or thing selected by the user from an image object including a plurality of persons and things.

The face or thing recognition algorithm may detect a person or thing using outline (silhouette) information relating to the person or thing distinguished from other areas of an image or the like.

That is, the face or thing recognition algorithm may be divided into a face or thing area extracting process of identifying where is a face or thing on an entire image, and a face or thing recognizing process of determining who or what is the extracted face or thing.

The face recognizing process may be performed to determine a face based on distances among major parts of a face, namely, eyes, a nose and a mouth, and shapes thereof, and recognize a face by employing a mathematical technique called Principal Component Analysis (PCA). This is a technique that an image is analyzed to acquire a major characteristic with neglecting a minute error, to be compared with another face picture.

Also, various algorithms may be used in addition to the face or thing recognition algorithm.

As described above, in accordance with the mobile terminal and the control method thereof according to the present disclosure, it may be possible to retrieve objects having data corresponding to information selected by a user from several information included in an object selected by the user, which allows a user to retrieve desired information in an efficient manner.

Hereinafter, description will be given of a method for setting a retrieval condition or retrieval range for objects associated with an object selected by a user, with reference to FIGS. 6A to 6D.

FIGS. 6A to 6D are overviews showing a method for setting a retrieval condition or retrieval range in the mobile terminal.

According to the mobile terminal and the control method of the present disclosure, it may be allowed to detect various types of information included in an object selected by a user, as aforementioned.

Here, the controller 180 may retrieve objects having data corresponding to all of a plurality of information detected, or objects having data corresponding to one of the plurality of information.

Also, the controller 180 may allow the user to select whether to retrieve objects having data corresponding to all of a plurality of information detected, or objects having data corresponding to one of the plurality of information.

Figure 6A:
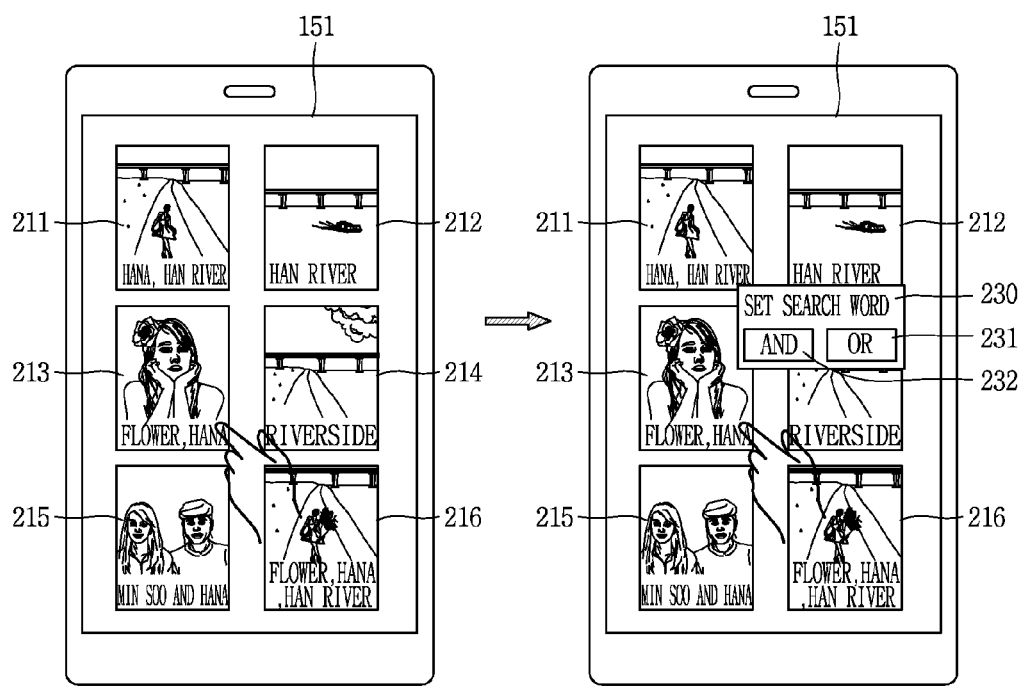
FIGS. 6A to 6D are overviews showing a method for setting a retrieval condition or retrieval range in the mobile terminal.

For example, as shown in FIG. 6A, when the user selects the 3rd image object 213, the controller 180 may detect two tags, namely, 'Flower' and 'Hana,' included in the 3rd image object 213, display a setting window 230, and determine by which combination of the detected tags other objects are retrieved.

When the user selects 'AND' button 231, the controller 180 may retrieve objects having data satisfying both tags 'Flower' and 'Hana.' When the user selects 'OR' button 232, the controller 180 may retrieve objects having data including only one of the tags 'Flower' and 'Hana.'

According to the mobile terminal and the control method of the present disclosure, it may also be allowed for various settings of a range in which objects are retrievable, when retrieving other objects associated with an object selected by the user.

That is, the controller 180 may retrieve objects belonging to a database within another range as well as a database to which the object selected by the user belongs.

For example, when an object selected by the user is 'image object' and the image object is stored in a photo-related database, the controller 180 may retrieve objects, which have data corresponding to information included in the 'image object' but belong to another database, for example, a schedule database, other than the photo-related database.

Figure 6B:
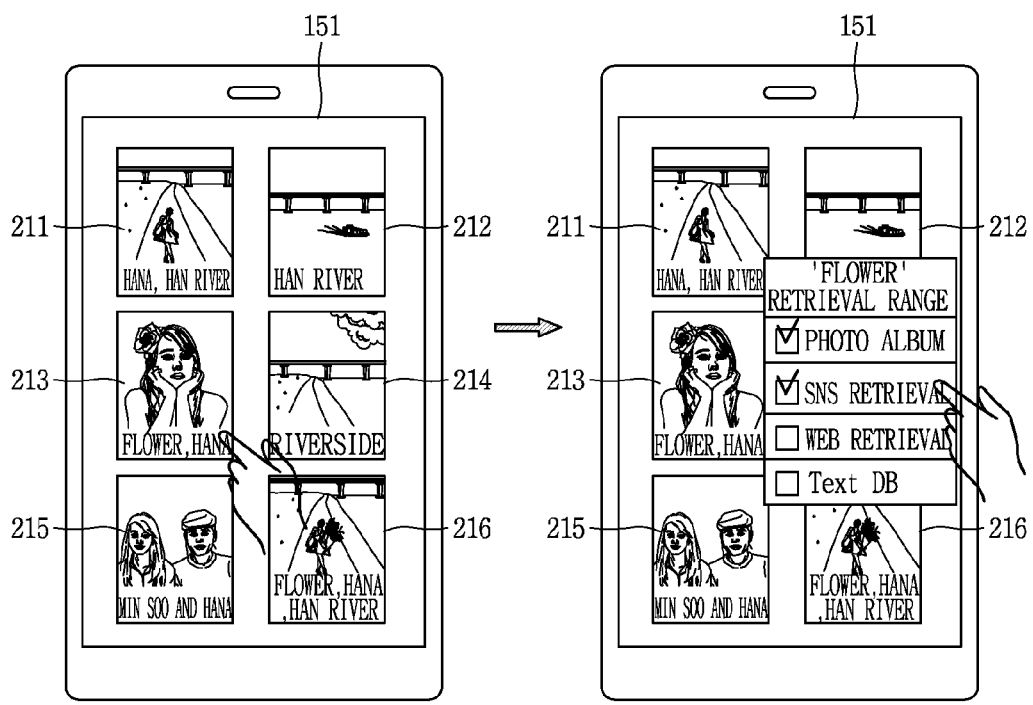

As one example, as shown in FIG. 6B, a range in which objects are retrievable may be selected by the user. When the user selects an object, the controller 180 may display a search (retrieval) window 240 indicating a retrievable range, and control the user to select the retrieval range through the search window 240.

Figure 6C:
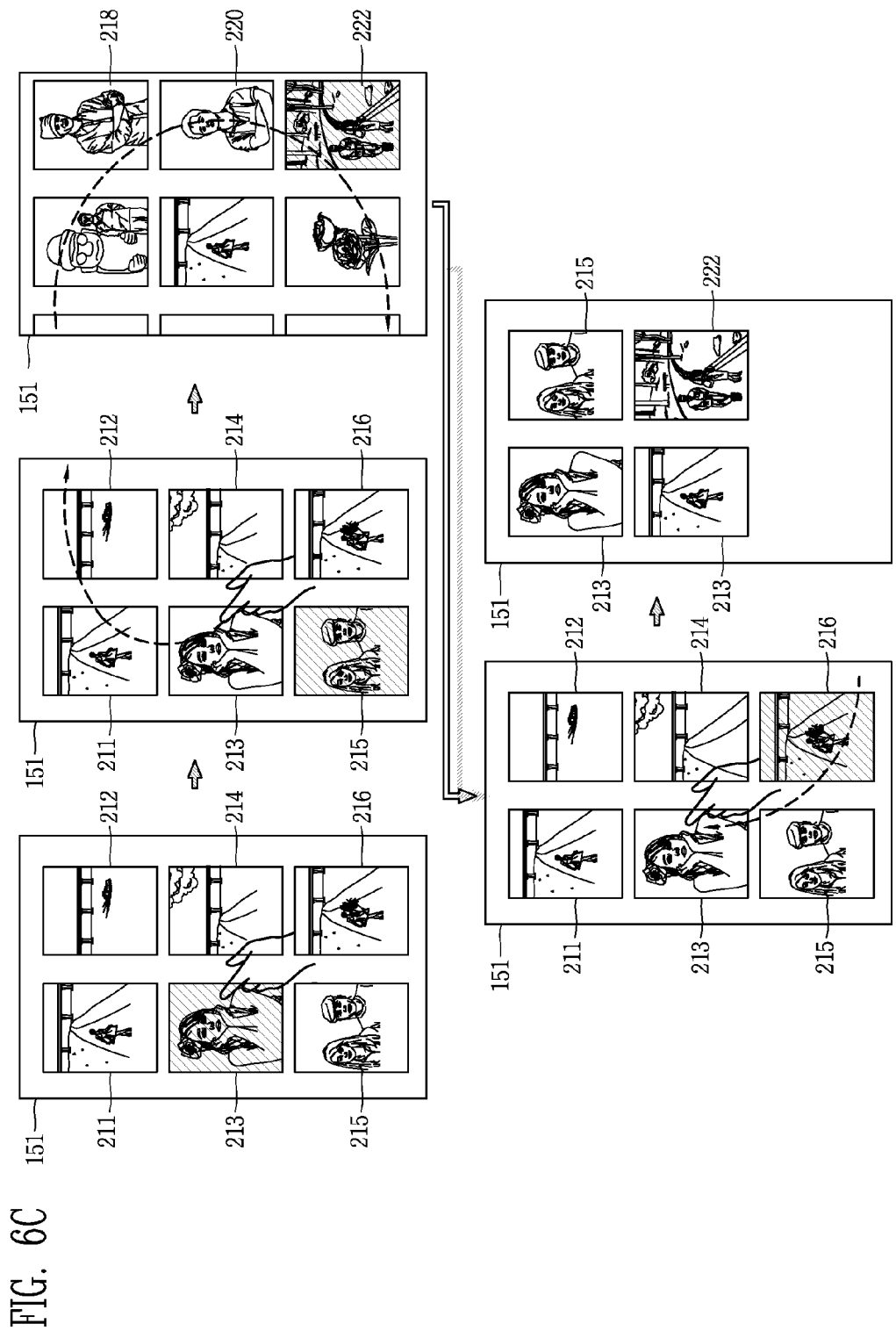
Figure 6D:
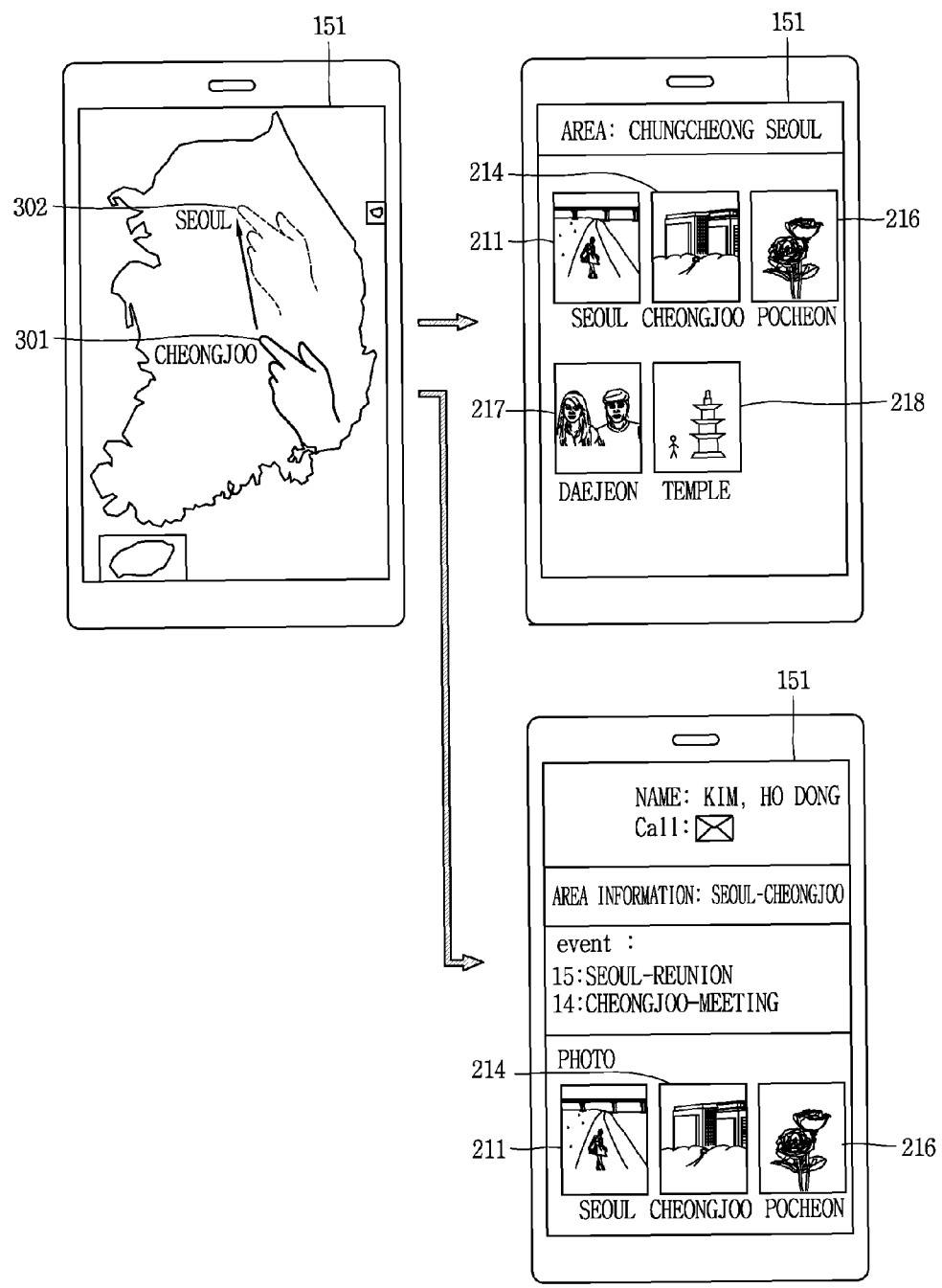

As another example, referring to FIGS. 6C and 6D, a retrieval range may be set directly by the user by virtue of a touch input or a key manipulation with respect to the display unit 151.

For example, when the user touches a random area on the display unit 151 where a plurality of objects are displayed, the controller 180 may set objects displayed within a radius, which is set based on the touched area, as a retrieval range.

Referring to FIG. 6C, the controller 180 may set a plurality of objects, which are surrounded by a drag touch input detected on the display unit 151, as a retrieval range.

Also, when a point or a plurality of points on a map displayed on the display unit 151 is (are) selected by the user, then the controller 180 may detect area information relating to the user-selected point(s), and accordingly retrieve objects having data corresponding to the detected area information.

For example, as shown in FIG. 6D, when the user drags from a first point 301 to a second point 302, the controller 180 may retrieve objects corresponding to area information from 'Chungcheong' corresponding to the first point 301 to 'Seoul' corresponding to the second point 302.

Still referring to FIG. 6D, when the user first selects a specific person or an image object 310 and then selects a specific area on a map, the controller 180 may retrieve objects having data satisfying both the person and the area information selected by the user.

For example, if the person selected by the user is 'KIM, HO DONG' and the selected area is from 'Chungcheong' to 'Seoul,' the controller 180, as shown in FIG. 6D, may retrieve objects, such as schedule, picture, message, call history and the like, related to 'KIM, HO DONG' and the areas.

As described above, according to the mobile terminal and the control method thereof, the retrieval range and the retrieval condition may be set by the user selection, whereby the user can efficiently retrieve objects that the user is interested.

Hereinafter, description will be given of a method for displaying objects retrieved by the controller 180, with reference to FIGS. 7A to 7F.

FIGS. 7A to 7F are overviews showing a method for displaying retrieval results in the mobile terminal.

As aforementioned, once retrieving other objects associated with the object selected by the user, the controller 180 may process the retrieved objects to be associated with the selected object.

As one example, the controller 180 may display 1st, 2nd, 5th and 7th image objects 211, 212, 215 and 217, which are retrieved in association with the 3rd image object 213 selected by the user, on the display unit 151 together with the 3rd image object 213.

Figure 7A:
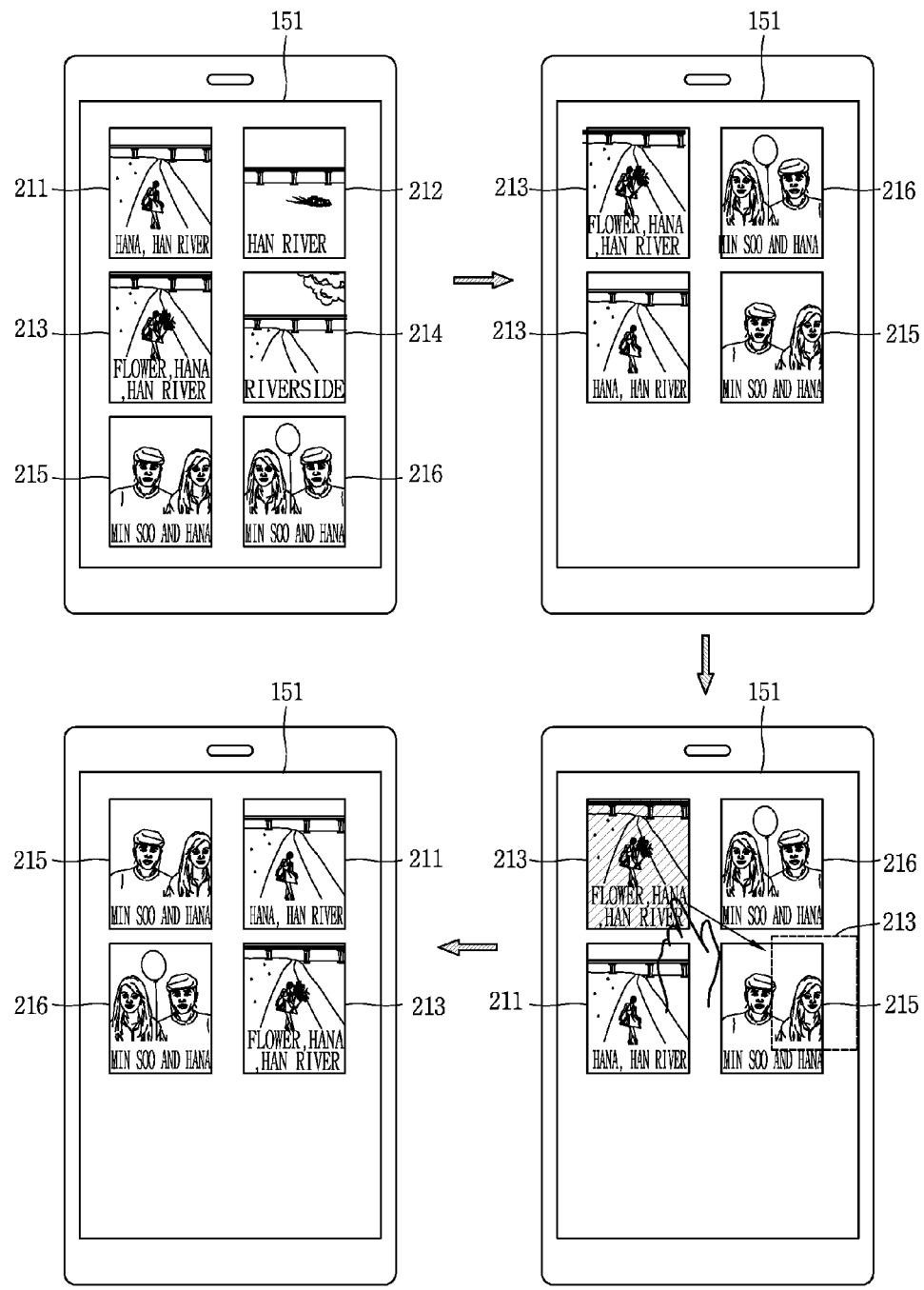

As shown in FIG. 7A, the controller 180 may display retrieved objects according to a preset reference. The reference may be preset by the user or the controller 180.

Examples of the preset references may include a time-based sequence, a level corresponding to information included in a selected object, namely, priority, a type of objects and the like.

Still referring to FIG. 7A, the controller 180 may display a 1st image object, which includes the most tags overlapped with information, for example, tag information, included in the 3rd image object 213 selected within a preset range, to be more adjacent to the 3rd image object 213 than other objects.

That is, the controller 180 may display the retrieved objects to be displayed adjacent to the selected object in the order of priorities thereof. The reference corresponding to the priority may be variously set by the user or the controller 180.

For example, when the position of the image object 213 selected by the user is changed, the controller 180 may realign the retrieved objects according to priorities, for example, a lapse of time, based on the position change of the image object 213, so as to display them on the display unit 151.

Figure 7B:
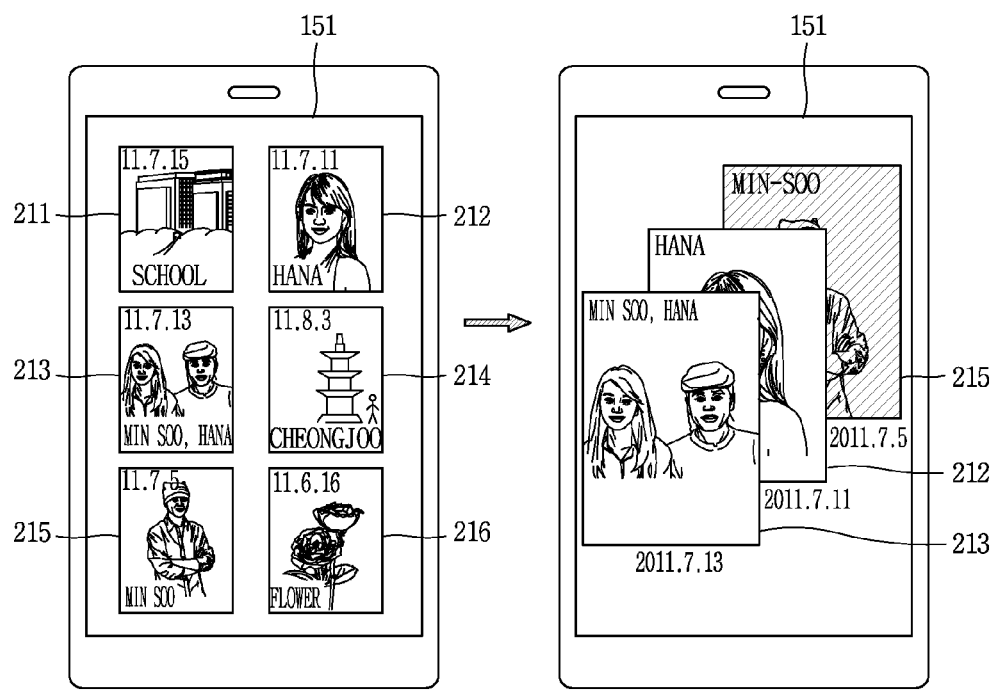

Also, referring to FIG. 7B, the controller 180 may display the selected objects and the retrieved objects according to a lapse of time.

The controller 180 may display the objects according to the lapse of time, and display the 5th image object 215, which was stored or generated relatively long before a date on which the 2nd image object 212 was stored or generated, to be vague, thereby allowing the user to immediately recognize intuitive date information relating to the objects.

The controller 180 may align objects by at least one of other references, for example, person, tag, attribute information on objects, and the like, in addition to the time sequence, and display the selected object and the retrieved objects to be consecutive according to the aligned reference.

A position where the user-selected object 213 is displayed on the display unit 151 may be set or changed, and the controller 180 may realign the retrieved objects to display them on the display unit 151 based on the position of the selected object 213.

Referring to FIG. 7C, the 1st to 9th image objects 211 to 219 each including area information may be displayed on a map based on area information included in each of them.

The controller 180 may also retrieve objects having data corresponding to the area and the 1st image object 211 selected by the user on the map, and display the retrieved 2nd and 3rd image objects 212 and 213 on the map together with the 1st image object 211.

Figure 7D:
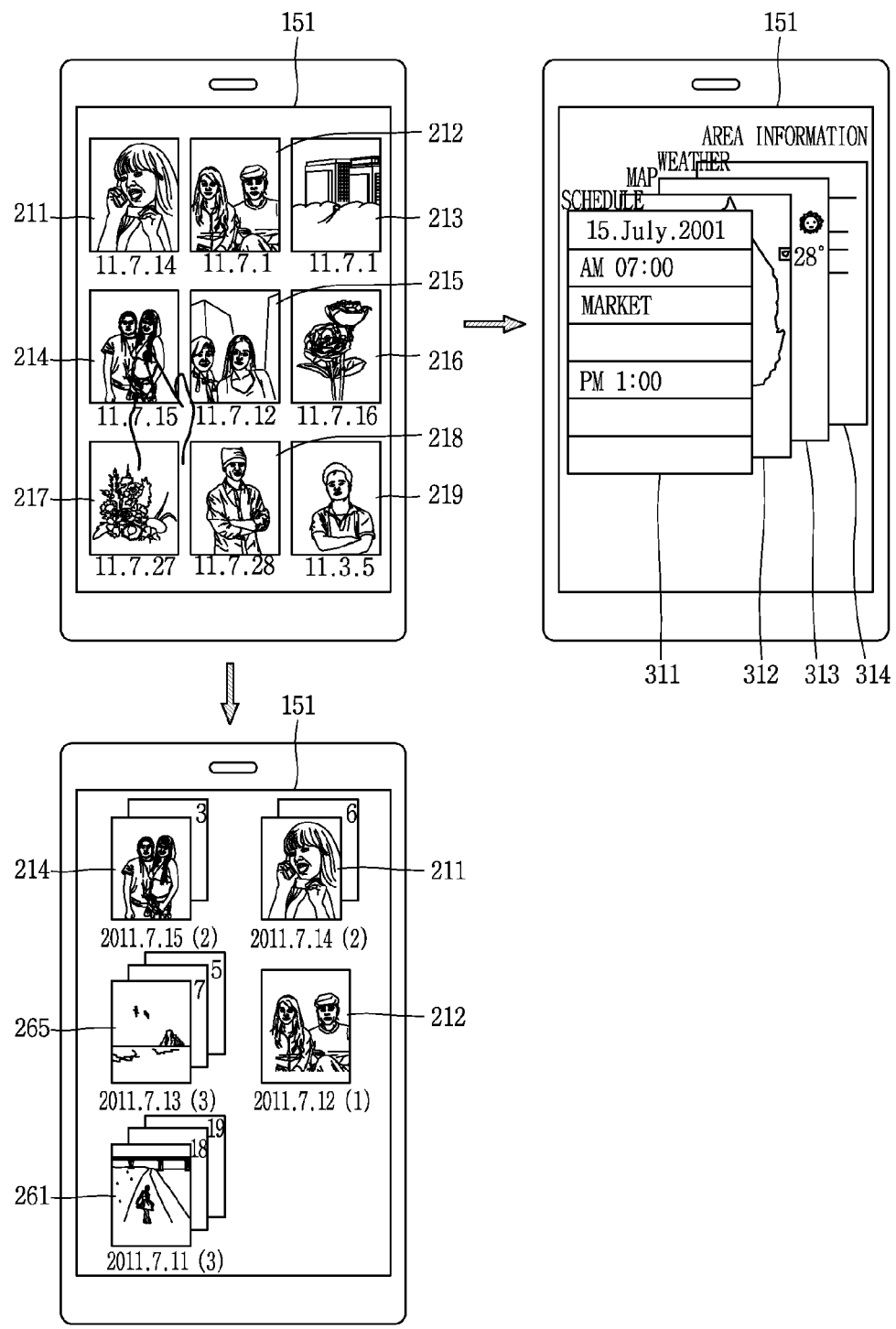

Referring to FIG. 7D, the controller 180 may display objects associated with the 4th image object 214 selected by the user on different windows.

For example, the controller 180 may display specific objects having data corresponding to date information of the 4th image object 214 on a first display window 311, and a map object corresponding to area information of the 4th image object 214 on a second display window 312.

Also, weather information corresponding to the date on which the 4th image object 214 was stored may be displayed on a third display window 313, and news information corresponding to the date on which the 4th image object 214 was stored may be displayed on a fourth window 314.

That is, the controller 180 may use several display windows to separately display objects with different attributes.

Also, still referring to FIG. 7D, the controller 180 may display objects retrieved based on date information. Also, the controller 180 may display the objects according to each date in a stacked state, which may allow a user to intuitively recognize the number of objects.

Figure 7E:
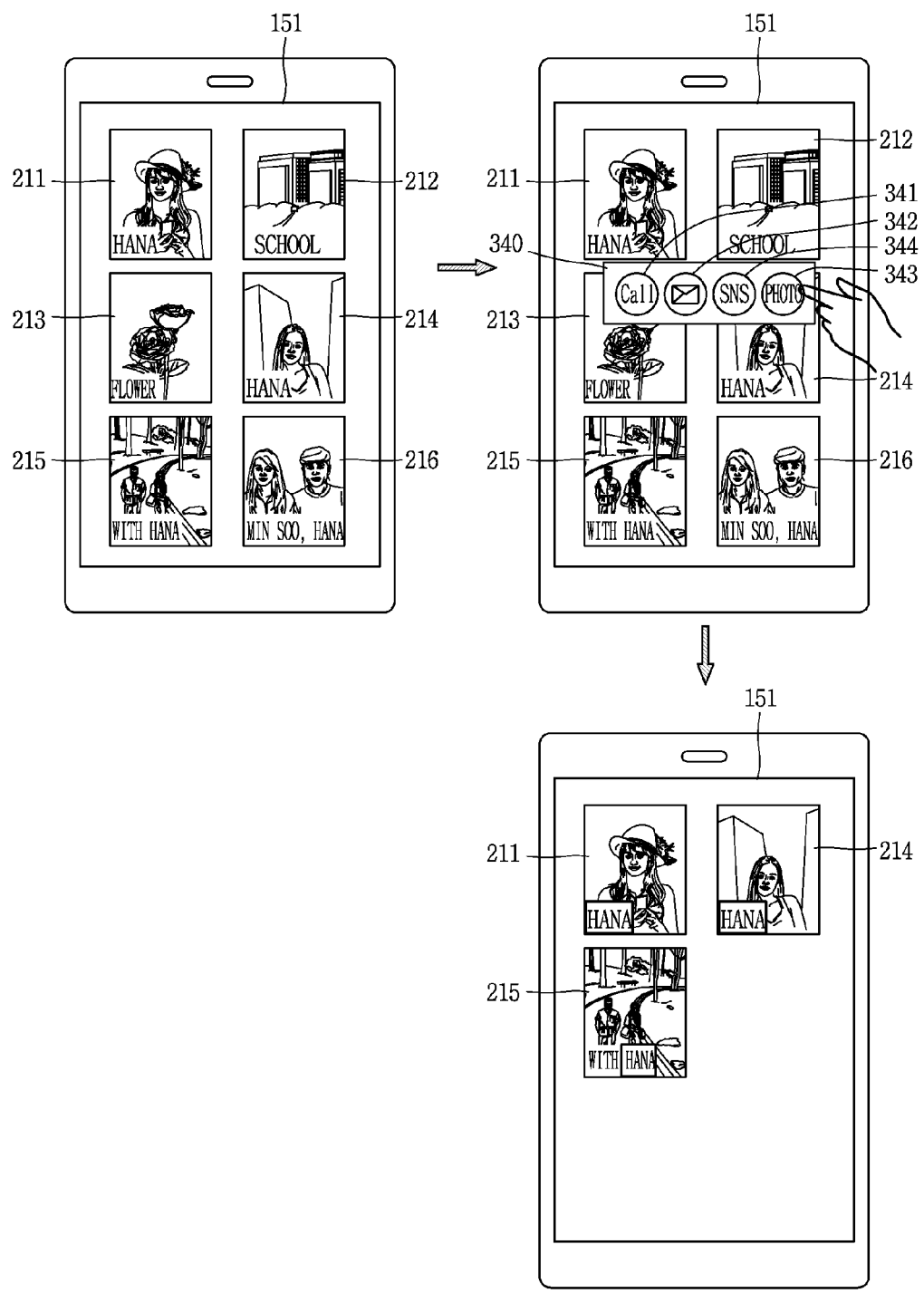

Referring to FIG. 7E, the controller 180 may display a select window 340, without directly displaying the retrieved objects, to allow the user to set only objects including desired attributes to be displayed.

The controller may sort the retrieved objects into several categories, such as call, message, SNS, photo and the like, and display the sorted categories on the display unit 151 using the select window 340. If the user selects 'PHOTO button' 344 on the select window 340, the controller 180 may display only photo objects associated with the 4th image object 214 selected by the user on the display unit 151.

Figure 7F:
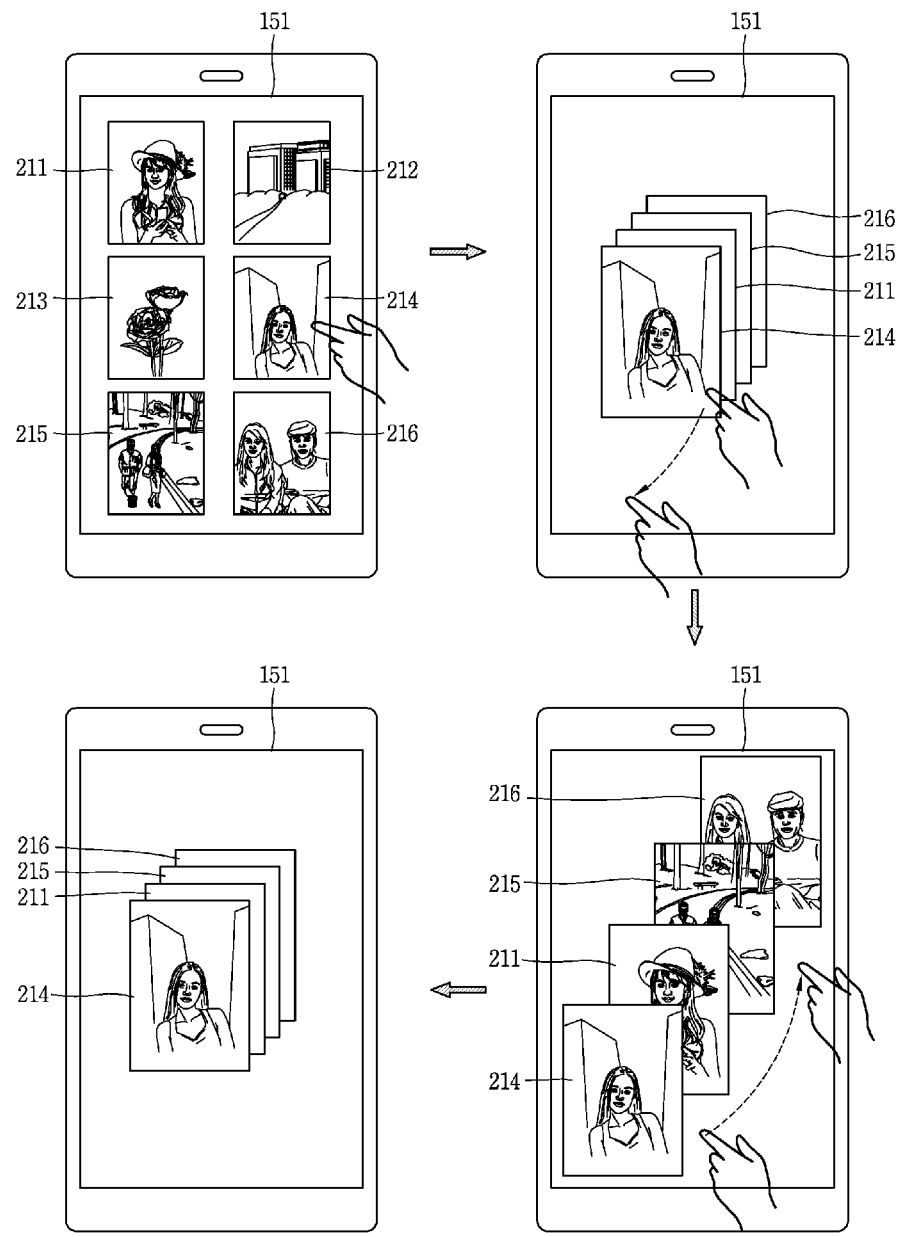

Referring to FIG. 7F, the controller 180 may display the retrieved objects in an overlapping manner. Afterwards, upon detecting a touch input on an area displayed in the overlapping manner, the controller may then sequentially display the retrieved objects with flicking them according to a preset reference, for example, according to a time sequence.

Also, the controller 180 may display unfolded objects to be overlapped again upon applying a touch input onto the display unit 151 in a specific direction. Also, when the display unit 151 outputs a three-dimensional (3D) image, the image objects may be three-dimensionally unfolded with being flicked according to a time sequence.

As described above, according to the mobile terminal and the control method thereof according to the present disclosure, objects can be aligned according to a preset reference to thusly be displayed according to priorities, thereby providing intuitive information immediately to a user.

According to the mobile terminal and the control method thereof according to the present disclosure, when a user selects an object, information included in the selected object may be detected and objects corresponding to the detected information may be retrieved and processed to be associated all together, thereby allowing the user to recognize the associated objects at a glance.

According to the mobile terminal and the control method thereof according to the present disclosure, information included in an object selected by a user can be automatically detected and objects corresponding to the detected information may be retrieved, which results in reduction of burdens caused due to separate inputting of search words for retrieving associated objects.

According to the mobile terminal and the control method thereof according to the present disclosure, retrieved objects can be aligned according to a specific reference and displayed together with an object selected by a user, thereby providing intuitive information between the selected object and the retrieved objects.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display unit configured to display one or more objects and receive a user input; and
a controller configured to:
detect information included in an object selected by the user input from among the one or more objects displayed on the display unit;
retrieve at least one object from the one or more displayed objects that comprise data corresponding to the detected information; and
associate the retrieved at least one object with the selected object.

2. The terminal of claim 1, wherein the controller is further configured to detect one or more tags included in the selected object.

3. The terminal of claim 2, wherein the controller is further configured to:
control the display unit to display the one or more tags for the user to select; and
retrieve one or more objects corresponding to at least one of the one or more tags selected by the user.

4. The terminal of claim 1, wherein the controller is further configured to:
set a retrieval condition based on a user selection; and
retrieve at least one of the displayed one or more objects corresponding to the set retrieval condition.

5. The terminal of claim 1, wherein:
at least one of the one or more objects is an image that comprises at least one person or thing that can be selected by the user; and
the detected information relates to the at least one person or thing in the image.

6. The terminal of claim 5, wherein the controller is further configured to use a recognition algorithm to recognize the at least one person or thing in the image.

7. The terminal of claim 6, wherein the controller is further configured to detect user selection of at least one of a plurality of recognized at least one person or thing in the image.

8. The terminal of claim 7, wherein the controller is further configured to control the display unit to display the plurality of recognized at least one person or thing in a highlighted manner.

9. The terminal of claim 1, wherein:
the controller is further configured to set a retrieval range based on a user selection; and
the set retrieval range comprises the at least one object that comprises data corresponding to the detected information.

10. The terminal of claim 9, wherein the controller is further configured to:
control the display unit to display a plurality of possible retrieval ranges, wherein each possible retrieval range comprises one or more objects that each comprise data corresponding to the detected information; and
set the retrieval range as one or more of the plurality of possible retrieval ranges selected by the user.

11. The terminal of claim 9, wherein the controller is further configured to set the retrieval range based on a touch point detected on the display unit.

12. The terminal of claim 9, wherein the controller is further configured to set the retrieval range based on a detected dragging motion around a portion of the display unit.

13. The terminal of claim 1, wherein the controller is further configured to control the display unit to concurrently display the selected object and the retrieved at least one object.

14. The terminal of claim 13, wherein the controller is further configured to set a distance between the selected object and each of the retrieved at least one object displayed on the display unit based on a priority of each of the retrieved at least one object.

15. The terminal of claim 14, wherein the controller is further configured to control the display unit to display a sequence comprising the retrieved at least one object adjacent to the selected object such that a retrieved object of relatively higher priority is in relatively closer proximity to the selected object than a retrieved object of relatively lower priority.

16. The terminal of claim 13, wherein the controller is further configured to:
fix a position of the selected object displayed on the display unit based on a user selection; and
the retrieved at least one object is aligned based on the fixed position of the selected object.

17. The terminal of claim 16, wherein the controller is further configured to realign the position of the retrieved at least one object on the display unit when the position of the selected object is changed by the user.

18. The terminal of claim 17, wherein the controller is further configured to control the display unit to:
arrange the retrieved at least one object based on a reference that comprises at least a date, a person, a tag or attribute information; and
display a consecutive sequence of the retrieved at least one object based on the reference.

19. A mobile terminal comprising:
a display unit configured for displaying one or more objects that comprise at least a first object and a second object; and
a controller configured to:
detect information included in the first object selected by a user; and
control the display unit to display the second object adjacent to the first object, wherein the second object comprises data corresponding to the detected information.

20. The terminal of claim 19, wherein:
the first and second objects each comprise position information; and
the display unit is further configured for displaying a map showing the first and second objects according to their respective position information.

21. The terminal of claim 19, wherein the controller is further configured to control the display unit to:
display the second object in a highlighted manner; and
display one or more function menus associated with the second object.

22. A method for controlling a mobile terminal, the method comprising:
detecting information included in an object displayed on a display unit and selected by a user, the object selected from among one or more objects that are displayed on the display unit;
retrieving at least one object from the one or more displayed objects, each of the at least one object comprising data corresponding to the detected information; and
associating the retrieved at least one object with the selected object.

23. The method of claim 22, further comprising:
concurrently displaying the selected object and the retrieved at least one object on the display unit.

24. The method of claim 22, further comprising:
displaying the selected object on the display unit in a highlighted manner.

25. The method of claim 22, further comprising:
displaying one or more retrieval ranges on the display unit from which the at least one retrieved object associated with the selected object can be retrieved.

* * * * *